Oct. 31, 1967  G. BENOIT ET AL  3,350,680
ELECTRICAL CONNECTORS HAVING POSITIVE GRIPPING ACTION
Filed Jan. 24, 1967  3 Sheets-Sheet 1

INVENTORS
Gerard Benoit
Ferdy Mayer
Franz Mayer &
Pierre Thomas
BY Spencer & Kaye
ATTORNEYS INVENTORS
Gerard Benoit
Ferdy Mayer
Franz Mayer &
Pierre Thomas
BY Spencer & Kaye
ATTORNEYS

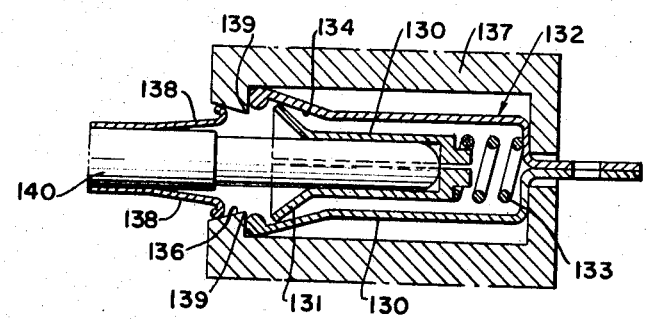
FIG. 12.
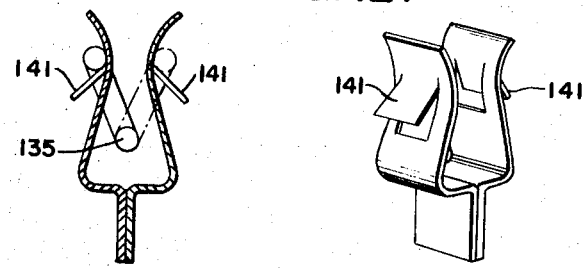
FIG. 13.  FIG. 14.
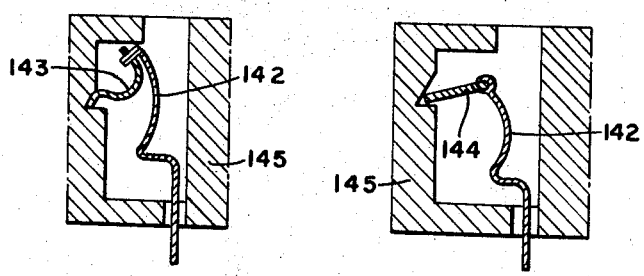 
FIG. 15.  FIG. 16.  FIG. 17.
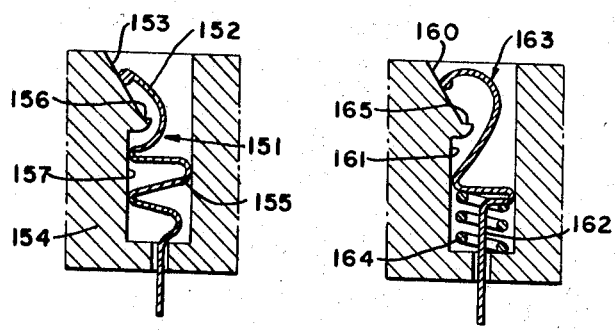
FIG. 18.  FIG. 19.

United States Patent Office 3,350,680
Patented Oct. 31, 1967

3,350,680
ELECTRICAL CONNECTORS HAVING POSITIVE GRIPPING ACTION
Gerard Benoit, 6 Rue du Cirque, Paris 8, France; Ferdy Mayer, 22 Rue Ampere, Grenoble, Isere, France; Franz Mayer, 6 Rue du Cirque, Paris 8, France; and Pierre Thomas, 2 Rue Charles Gounod, Grenoble, Isere, France
Filed Jan. 24, 1967, Ser. No. 618,242
Claims priority, application France, June 24, 1963, 939,143
15 Claims. (Cl. 339—253)

ABSTRACT OF THE DISCLOSURE

A female electrical connector having one portion which is movable in a longitudinal direction with respect to a stationary portion, the movable portion being movable under the action of an inserted plug between an open position in which it offers substantially no resistance to plug insertion and a closed position in which it tightly grips the plug, the movable portion cooperating with the stationary portion in such a way that a friction force exists therebetween which causes the movable portion to remain in its closed position until the start of plug withdrawal, the plug itself exerting a lateral force which prevents the movable portion from returning to its open position until the plug is withdrawn from the socket.

Cross reference to related application

The application is a continuation-in-part of our copending application, Serial No. 371,905, filed on June 2, 1964, now Patent No. 3,300,752 issued on Jan. 24, 1967.

Background of the invention

The present invention relates to the field of electrical connectors and more particularly to electrical plug sockets of the elastically deformable type.

Summary of the invention

It is a primary object of the present invention to assure, in an electrical circuit, a positive contact between a plug and a socket.

It is another object to achieve such a contact through the action of the pressure applied to insert the plug into the socket.

It is still another object of the present invention to provide mechanically simple receptacles which apply a positive lateral force to their mating plugs, the application of such force being triggered by the insertion of the plug.

Yet another object of the present invention is to provide a more forceful contact than that which is obtainable in the prior art spring contact devices.

These and other objects according to the present invention are achieved by the provision of an electrical connector composed of a housing having a cavity formed therein, at least one socket disposed in the housing, socket deforming means operatively associated with the socket, at least one control means disposed in the housing cavity, and friction holding means. The cavity is formed to be in communication with the region outside the housing and the socket is elastically deformable in a transverse direction and is disposed for receiving a plug to be inserted in a longitudinal direction in the socket. The socket deforming means have a first portion which is stationary with respect to the housing and a second portion which is movable in a longitudinal direction with respect to, and in sliding contact with, the first portion, the second portion being operatively associated with the socket for elastically deforming it transversely into a locking position where it tightly grips the inserted plug. The control means are connected for longitudinal movement with the second portion of the socket deforming means and are disposed in the path over which the plug will travel when it is being inserted in a longitudinal direction in the socket for being moved longitudinally by the plug at least during the latter portion of its insertion travel, this movement of the control means operating to cause the second portion of the socket deforming means to deform the socket into its plug-gripping position. The holding means, which are constituted by a friction surface, are positioned to cooperate with the second portion of the deforming means to create a longitudinal restraining friction force which maintains that second portion in the position in which it causes the socket to tightly grip the plug, and to maintain a substantially constant gripping pressure on the plug, after the plug has been fully inserted, the holding means applying to the second portion of the deforming means a longitudinal restraining friction force which is at least as great as any restoring force existing in the socket assembly and tending to restore the socket to its open position, but which is less than the combined opposing longitudinal force exerted on the second portion when the plug is being withdrawn from the socket, whereby said second portion moves in unison with the plug during plug withdrawal.

Briefly stated, the present invention contemplates the provision of socket members made of an elastically deformable material and associated with other elements which permit it to pass from an open state to a closed state, this passage being produced by the longitudinal pressure exerted by the insertion of a mating plug.

This arrangement thus permits the simple act of inserting a plug to automatically produce a tight gripping action by the socket, thus assuring a connection which is extremely solid, both electrically and mechanically. Such a device also permits plugs having various sizes and shapes to be firmly held in the socket.

The insertion of the plug can be accompanied either with or without a sliding contact of the plug with the socket and, in either case, will be terminated by the movement of the socket into a stable gripping position.

The inserted plug exerts a lateral holding force which holds the socket in its locking position. The plug continues to exert this locking force, and thus to cause the socket to remain in its locking position, until the beginning of plug withdrawal, at which time the holding force exerted by the plug is removed and the socket is permitted to return progressively to its "unlocked," or open, condition.

In the various embodiments of the present invention, the movement of the socket into its locking position will be effectuated by the cooperation of a movable portion either with a camming surface or with an inclined surface which is stationary with respect to the movable position.

Brief description of the drawings

FIGURE 12 is a longitudinal, cross-sectional view of yet another embodiment of the present invention.

FIGURE 13 is a cross-sectional side view of a modified form of construction of the embodiment of FIGURES 8 to 11.

FIGURE 14 is a perspective view of one element of the arrangement of FIGURE 13.

FIGURE 15 is a longitudinal, cross-sectional view of yet another embodiment of the present invention.

FIGURE 16 is a longitudinal, cross-sectional view of a modified form of construction of the embodiment of FIGURE 15.

FIGURE 17 is a cross-sectional detail view of a modified form of construction of one element of the arrangement of FIGURE 16.

FIGURE 18 is a longitudinal, cross-sectional view of an additional embodiment of the present invention.

FIGURE 19 is a longitudinal, cross-sectional view of a modified form of construction of the embodiment of FIGURE 18.

*Description of the preferred embodiment*

As will be described in detail below, embodiments of the present invention are constructed so that the lateral force exerted by the plug will create a longitudinal friction holding force which is at least equal to, and preferably greater than, the sum total of any restoring force existing in the socket for the purpose of urging it into an open position, the lateral holding force being exerted by the plug until the beginning of plug withdrawal.

Figure 1:
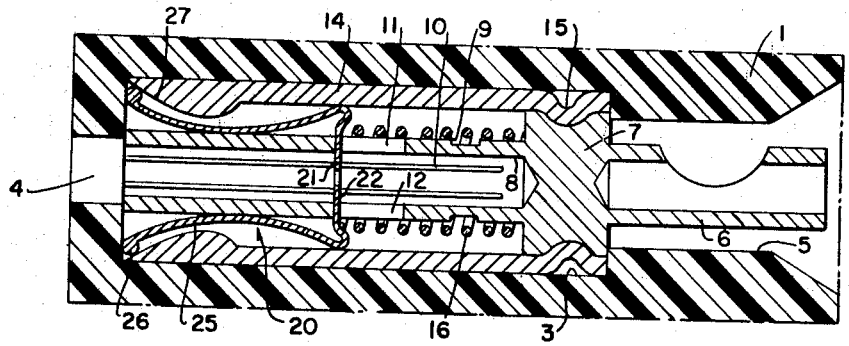
FIGURE 1 is a longitudinal, cross-sectional view of one embodiment of the present invention in its unlocked, or open, state.
Figure 2:
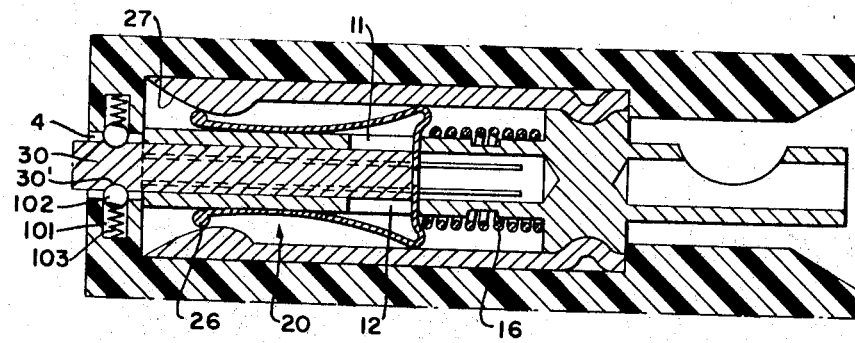
FIGURE 2 is a view similar to that of FIGURE 1 of the embodiment of FIGURE 1 in its gripping position.
Figure 3:
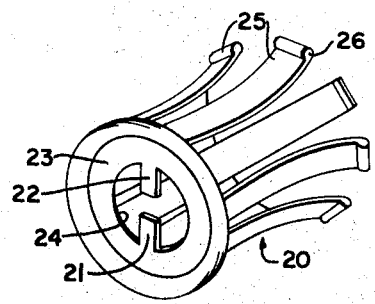
FIGURE 3 is a perspective view of one element of the embodiment of FIGURES 1 and 2.

Referring now to FIGURES 1, 2, and 3, there is shown a first embodiment of the present invention which includes a casing, or housing, 1 made of an electrically insulating material and formed of two separable halves which are joined together along the horizontal plane which is perpendicular to the plane of the figures. The casing defines a series of cylindrical socket housings which are in line with one another, said series extending along said horizontal plane. One of these housings is shown in cross section in FIGURES 1 and 2 and comprises a cylindrical cavity 3 extending between a small access opening 4 for receiving a plug and a rear opening 5 for receiving a connecting wire (not shown) which will be inserted into, and soldered to, the solder terminal 6, which is formed as a projection on the rear base of a piece 7. The piece 7 also comprises a hollow projection 8 which extends from its frontal base axially across the cavity 3 to form a plug socket. The projection 8 has a circular groove 9 formed on its outer surface and a series of longitudinal slits 10 spaced around its periphery and extending to its forward base, i.e., the end in communication with access opening 4. These slits cause the socket 8 to be radially elastically deformable over its forward portion. The socket 8 also has, in the region midway between its ends and forward of the groove 9, a pair of diametrically opposed openings 11 and 12 cut into its surface to serve as guides for the tabs 21 and 22 of the deformable element 20 (see FIGURE 3), tabs 21 and 22 serving as control means and being disposed in the path of travel of a plug to be inserted through opening 4. Element 20 comprises a circular base 23 in the circular opening 24 of which are formed said inwardly extending guide tabs 21 and 22. The opening 24 is designed to permit the base 23 to slide along the surface of socket 8. Connected around the periphery of base 23 are a plurality of strips 25, each of which is in the form of an arched leaf spring terminating in a fillet 26. Strips 25 and fillets 26 constitute the second portion of socket deforming means and are operatively associated with socket 8 for elastically deforming the socket into a position where it tightly grips an inserted plug. When the part 20 is mounted in the unit of FIGURES 1 and 2, the convex surfaces of springs 25 bear against the outer surface of the forward portion of socket 8 and the fillets 26 bear against the camming surface 27 which acts as a first portion of the socket deforming means and which is stationary with respect to the socket housing. The surface 27 has a radius which progressively decreases towards the rear of cavity 3.

The surface 27 etxends for a sufficient distance toward the rear of the cavity to assure that fillets 26 will remain in contact therewith even when the socket is fully closed, i.e., member 20 has been fully depressed. The caming surfaces 27 is formed on a sleeve 14 which is lodged in the cavity 3 and which has its rear portion firmly crimped around the socket carrying piece 7 so as to prevent any longitudinal movement of the latter.

The deformable element 20 is continuously urged into a normally open position, where fillets 26 will rest on the forward portion of surface 27, by elastic restoring means constituted by a compressed spiral spring 16 wrapped around the outer surface of the rear portion of socket 8 and compressed between the frontal base of piece 7 and the locking element base 23.

Referring particularly to FIGURE 2, in which the unit is shown to have a plug 30 inserted through opening 4, it may be seen that the act of insertion causes the leading end of the plug to first engage the control means constituted by tabs 21 and 22 and to then move the entire unit 20 towards the rear of cavity (to the right in FIGURES 1 and 2), thereby compressing spring 16 and causing fillets 26 to slide rearwardly along surface 27. This movement of the fillets produces a progressive radial compression of the springs 25, which in turn induces an inward radial deflection of the longitudinal elements of socket 8. This action continues until the tabs 21 and 22 reach the rear ends of openings 11 and 12, respectively, at which time the fillets 26 continue to bear upon the surface 27. At this point, the pressure exerted by springs 25 causes the sockets 8 to grip plug 30 with a firm positive pressure which serves to ensure an extremely good electrical and mechanical contact. The socket is prevented by the friction force existing fillets 26 and surface 27 and between plug 30 and socket 8 from ejecting the plug, the plug itself exerting a lateral, or radial, pressure to prevent the fillets from sliding outwardly on surface 27. It should be noted that even if the inner surface of socket 8 should become worn during its life, the positive radial force produced by springs 25 will continue to ensure a good contact and a good locking action. Accidental dislodgement of the plug is inhibited by the fact that a certain minimum extraction pressure must be exerted before the holding pressure of socket 8 is overcome. The beginning of plug withdrawal removes the principal force holding the fillets stationary and compressed spring 16 then drives element 20 back towards its normally open position, the element 20 moving in unison with plug 30.

Since the lateral force exerted by the plug on the socket causes the sum of the longitudinal friction forces between plug 30 and socket 8 and between the surface 27 and fillets 26 to be equal to or greater than the restoring force exerted by spring 16, the socket will remain in its gripping position, and hence will exert a constant holding force on plug 30 until the beginning of plug withdrawal, at which time the friction force between plug 30 and socket 8 is overcome. The remaining friction force between fillets 26 and surface 27 has a longitudinal component which is less than the restoring force of spring 16. Therefore, as the plug is withdrawn, element 20 will return progressively to its open position.

It is only necessary for the proper operation of this embodiment, that the angle between the surface 27 and the direction of movement of the plug be such that, taking into consideration the coefficient of friction between the fillets 26 and the surface 27, the friction force existing between these fillets 26 and the surface 28 when the fillets 26 are pressed against the surface 28 by the inserted plug has a longitudinal component which is sufficient to ensure that the above-noted condition is satisfied. That is, this friction force must be small enough that, by itself, it is less than the restoring force exerted by spring 16, and yet it must be large enough that the sum of it and the friction force between plug 30 and socket 8, when the plug is fully inserted, is greater than the spring restoring force. The same consideration applies to the other illustrated embodiments of the present invention in that any one of them can be constructed with a friction camming surface which is formed in compliance with the above-mentioned conditions.

The form of construction illustrated in FIGURES 1 and 2 is also preferably provided with a locking member 101 which is arranged to cooperate with an annular notch formed in plug 30. The locking member might be composed, for example, of a plurality of ball bearings 102 urged into notch 30' by springs 103, the springs 103 and balls 102 being disposed in radially extending cavities 101. This locking member serves to prevent the accidental ejection of plug 30 from the socket. Any of the other embodiments of the invention illustrated herein are also preferably constructed to include such a locking member.

It should be appreciated that since, in the embodiment of FIGURES 1 and 2, the plug 30 is separated from the longitudinally movable member 20 by longitudinally immovable socket 8, the plug will not, in this embodiment, exert any longitudinal force on member 20 during withdrawal. Such a longitudinal force will be exerted only when the plug is in contact with the longitudinally movable portion of the connector assembly, as is the case for most of the remaining embodiments of the present invention to be described below.

Figure 4:
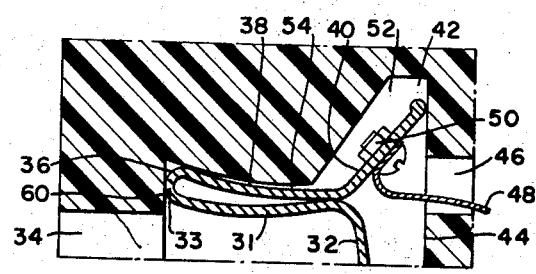
FIGURE 4 is a longitudinal, cross-sectional view of one-half of another embodiment of the present invention in its open position.
Figure 5:
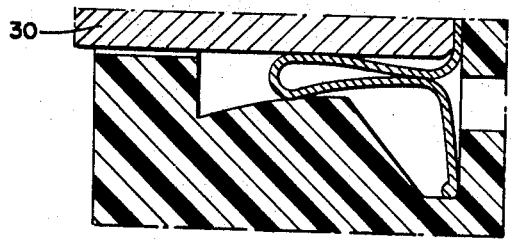
FIGURE 5 is a view similar to that of FIGURE 4 of one-half of the embodiment of FIGURE 4 in its gripping position.

Turning now to the embodiment shown in FIGURES 4 and 5, which is shown in FIGURE 4 in its open position and in FIGURE 5 in its closed position, the functions of the socket 8, deformable element 20, and restoring spring 16 of FIGURES 1 and 2 are performed by various portions of a single, elastically deformable, electrically conductive piece having an appropriate cross section, as shown in FIGURES 4 and 5, and having an indefinite length perpendicular to the plane of the drawings.

The profile of the deformable element comprises a central portion 31 forming a canal which is designed to act as a female contact element, or socket. This portion 31 extends between an axially centered base portion 32 constituting the control means for the device and a frontal portion 33, the last-named portion being disposed near the top and the bottom of a plug access opening 34. This opening is in the form of a continuous slot of indefinite length which extends into the plane of the paper for an extent equal to that of the above-described deformable piece.

Adjacent frontal portion 33, the unitary piece is folded back at 36 to form a support portion 38 which is coextensive with section 31, the portions 38 and 31 being spaced very close to one another. The portion 36 and the front of portion 38 together constitute the second portion of the socket deforming means of this embodiment. The rear of portion 38 is adjacent a supporting leg portion 40 which extends laterally outward and which is terminated by a lip 42 which bears against the base 44 of the housing. It should be noted that each portion enumerated in connection with FIGURE 4 has its corresponding member on the lower half of the element, i.e., that half shown in FIGURE 5.

The base 44 has at least one opening 46 to permit the insertion of a connecting wire 48 and the leg portion 40 has at least one connector of the permanent type, such as a nut and bolt 50, for attaching the wire 48 to the deformable element.

The housing includes, starting from base 44, a widened, or bell-shaped portion 42, and a section 54 constituting an inclined camming ramp 56. The forward end of ramp 54 is terminated by retaining abutment 60 against which the forward portions 33 and 36 of the deformable element rest when the unit is in its normally open condition.

When a plug 30 is inserted through opening 34, as shown in FIGURE 5, it advances easily until abutting against the control means constituted by base portion 32. As the insertion continues, the forward portion of the plug contacts portion 31 of the female element and the leading face of the plug moves base 32, and canal portion 31, towards the rear of the housing causing support portion 38 to slide backwards over the ramp 56 and contact portion 31 to grip plug 30. This action continues until leg portion 40 has spread outward to a point where lip 42 is prevented by the housing from further outward movement, at which time the forward folded portion 36 of the deformable element is held against surface 54. The socket remains in this position due to the fact that the longitudinal component of the friction force between portion 38 and surface 54 is greater than the restoring force exerted by leg portion 40.

When the plug is removed, the force exerted by plug 30 on portion 31 cooperates with the force exerted by leg portion 40 to overcome the friction force between portion 38 and surface 54 and the unit resumes the position shown in FIGURE 4, the leg portion 40 acting as an elastic restoring means and providing the necessary restoring spring action and portion 30 moving in unison with plug 30 so that no sliding occurs between these members.

It should be particularly noted that the embodiment shown in FIGURES 4 and 5 is capable of receiving several plugs spaced along its length (perpendicular to the plane of the figures). Since the female connector element is made of a flexible material, the insertion of one plug will produce a deformation only along a portion of its length. Therefore, a separate clamping action will be induced by the insertion of each plug, provided the plugs are spaced far enough apart along the length of the deformable receptacle.

Figure 6:
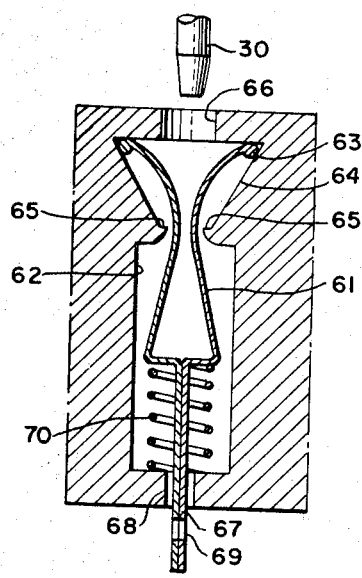
FIGURE 6 is a longitudinal, cross-sectional view of a further embodiment of the present invention.

Turning now to FIGURE 6, there is shown a female connecting element, or socket 61, disposed within the cavity of housing 62 and terminated by a pair of bearing fillets 63 constituting a part of the second portion of the socket deforming means of this embodiment.

This cavity is also defined by a pair of inclined contact-closing planes 64, each of which cooperates with a respective one of the fillets 63, the planes constituting the first portion of the socket deforming means of this embodiment and being terminated at their inner ends by abutment stop 65 and at their outer ends by an abutment in which is provided an opening 66 for admitting a connector plug 30. The female connector 61 is constituted in this embodiment by a symmetrical pair of elastically deformable elements having an appropriate configuration and having their rear portions 67 abutting and permanently connected together to cause the two halves of the connector to define a unitary element. The rear portions 67 contain a transverse opening 69 for the insertion and soldering to the connector of current-carrying wire (not shown), the portions 67 extending through an opening 68 arranged in the rear of housing 62 to permit the opening 69 to be outside of the housing. A compressed spiral spring 70 is provided in the housing cavity, between the rear face of the cavity and the portion of connector 67 which defines the base, or control means, of the female connector, for urging the connector towards the front of the housing. Spring 70 thus serves as the elastic restoring means for this device.

It should be noted that such an embodiment could also be modified to have a circular female connector having an axial stem.

The operation of the embodiment of FIGURE 6 is substantially identical with that of the embodiment of FIGURES 4 and 5.

The stops 65 define the end of longitudinal movement of fillets 63 and such stops may be provided in all of the other embodiments of the present invention.

Figure 7:
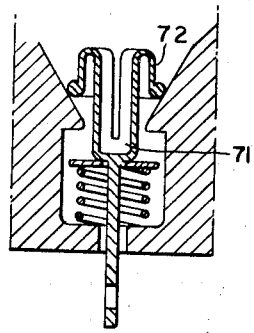
FIGURE 7 is a longitudinal, cross-sectional detail view of a modified form of construction of the embodiment of FIGURE 6.

In the variation shown in FIGURE 7, the split cylindrical socket member is furnished with a certain number of feet 72 which are folded backward from the leading edge of the plug-receiving portion and which constitute the second portion of the socket deforming means of this device.

FIGURES 8 to 11 show still another embodiment of the present invention in which a housing 75 contains a cylindrical plug-receiving opening 76 in communication with a cavity 77 comprising a larger portion 78 and a smaller portion 79, said portions 78 and 79 each having a rectangular base. A female plug element, held in said cavity 77 in an axially immovable manner, consists of an assembly of two elastically deformable members 80, each comprising an arched forward portion 81, a body 82 terminated by a right-angle bend, and a stem 83 passing through an opening 84 cut in the rear base of the housing in axial alignment with opening 76.

The means for producing a closing action of the female socket are constituted by a spring 85 of the clothes pin type. Such a spring may comprise a spiral torsion spring element 86 terminated at respective ends by arms 87 and 88 extending at right angles to the axis of portion 86, the ends of the arms themselves being bent at right angles to form respective, mutually parallel bearing arms 91 and 92. The action of the spring is such as to force the arms 91 and 92 towards each other. As is clearly shown in FIGURES 8 and 9, this spring is arranged so that arms 91 and 92 of spring 85 bear against the outer, concave, surfaces of the arched portions of respective members 80 and so that spring portion 86 will be engaged by the leading edge of an inserted plug 30.

When plug 30 is inserted, it moves forward until abutting against spring portion 86. Continued insertion forces portion 86 towards the rear of the housing, causing the arms 91 and 92 to slide rearwards along their respective bearings surfaces, thus forcing elements 81 together into a plug-gripping position.

The extent of the plug insertion can be limited by the abutment either of the spring portion 86 against the base of the female socket or of the arms 91 and 92 against the shoulders defining the boundary between the portions 78 and 79 of cavity 77. When the plug is withdrawn, the inclined surfaces of socket portions 8 produce a camming action which tends to move the spring unit 85 back to its rest position, as shown in FIGURE 8, the return movement producing a progressive opening of the female connector 80.

Turning now to FIGURE 12, there is shown an embodiment having a socket comprised of two rigid shells 130, preferably semi-circular in shape, having frontal portions 131 which form the plug-receiving opening of the socket, said shells being disposed in an axially movable manner in an elastic pincer 132, and bearing longitudinally against a restoring spring 133. The forward portion 134 of the pincer 132 is bent outwardly to form the socket closing ramp. The opening 136 in housing 137 has an outwardly opening frusto-conical shape, the inner end of which terminates on locking notch 139 for the leading edges of spring blades 138, the latter being joined to the wall of plug 140.

Upon insertion, the plug 140 will slide easily into socket 130 until reaching the bottom thereof. During insertion, the plug and socket will slide together towards the rear of the cavity, with the ramp 134 producing a progressive closing of the socket, until the springs 138 lock into the notches 139. The plug is released by pressing radially inwardly on blades 138 and withdrawing the plug.

Figure 8:
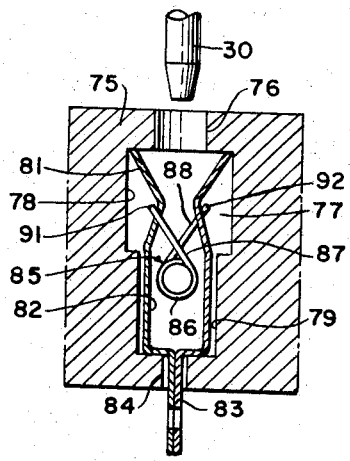
FIGURE 8 is a longitudinal, cross-sectional view of still another embodiment of the present invention in its open state.
Figure 9:
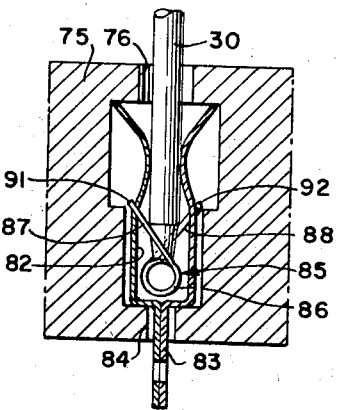
FIGURE 9 is a longitudinal, cross-sectional view of the embodiment of FIGURE 8 in its locking state.
Figure 10:
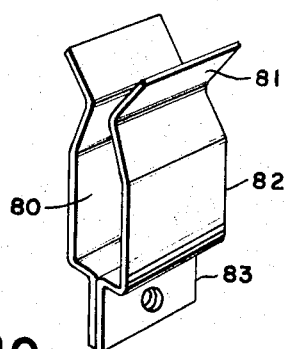
FIGURE 10 is a perspective view of one element of the embodiment of FIGURES 8 and 9.
Figure 11:
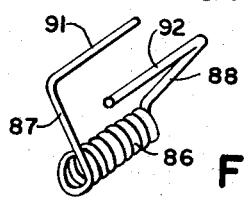
FIGURE 11 is a perspective view of another element of the embodiment of FIGURES 8 and 9.

FIGURES 13 and 14 illustrate a variation of the embodiment shown in FIGURE 8. The closing element 135 is simplified due to the fact that it is a rigid element. This unit 135 has parallel arms which bear against respective, laterally extending, flexible branches 141 which form ramps for urging the socket into a plug-gripping condition.

FIGURES 15 and 16 show variations in which only one laterally deformable element 142 is used to form the socket. The insertion of a plug causes this element to close due to the lateral force applied by the rotation either of a curved spring element 143, as shown in FIGURE 15, or of a rigid rod 144, as shown in FIGURE 16. The elements 143 and 144 are hinged to the housing 145 so as to rotate freely with respect thereto. In addition, the element 143 is rigidly fastened to its socket element 142, while element 144 is slidably joined to rotate wtih respect to its element 142. FIGURE 17 shows still another variation of this embodiment wherein the rigid rod is hinged to the socket element.

The embodiment of FIGURE 18 comprises a socket element 151, the forward portion 152 of which constitutes part of the second portion of the socket deforming means of this device and bears against, and acts in cooperation with a ramp 153 formed in the housing 154 and constituting the first portion of the socket deforming means. The rear portion 155 of the socket element 151 includes the socket control means and is folded several times to form a series of undulations which constitute the elastic restoring means for urging the element into its normally open position. The inner end of ramp 153 terminates at an abutment stop 156 which is followed by a longitudinal portion 157 having no incline with respect to the direction of longitudinal movement of the socket element.

FIGURE 19 illustrates an embodiment which is generally similar to that of FIGURE 18. In FIGURE 19 an abutment stop 165 is provided between ramp 160 and longitudinal portion 161, and the socket opening means comprises a separate spiral spring 164, disposed around a rigid stem portion 162 of socket element 163. In this embodiment, the locking of an inserted plug could be achieved by means similar to those shown in FIGURE 12, or by any other appropriate means, as is true for the other illustrated embodiments of the present invention.

The manner of operation of these last-described embodiments is similar to that of the embodiments described earlier in the specification.

It is interesting to note that several of the embodiments described herein, in particular that of FIGURES 4 and 5, could advantageously be used in the construction of electrical outlet systems for the home, especially for room baseboards where it is desired to have a continuous plug receptacle extending horizontally along the wall.

The specific embodiments shown herein are only intended to serve as examples of the possible forms which the present invention may take and should not be considered to be limitative of its scope. It is intended that this invention be limited only by the breadth of the appended claims.

We claim:
1. An electrical connector comprising, in combination:
 (a) a housing having a cavity formed therein so as to be in communication with the region outside said housing;
 (b) at least one socket disposed in said housing, said socket being elastically deformable in a transverse direction and being disposed for receiving a plug to be inserted in a longitudinal direction in said socket;

(c) socket deforming means operatively associated with said socket and having a first portion which is stationary with respect to said housing and a second portion which is movable in a longitudinal direction with respect to, and in sliding contact with said first portion, said second portion being an elastically deformable member which is operatively associated with said socket for elastically deforming it transversely into a locking position where it tightly grips the inserted plug;

(d) at least one control means disposed in said housing cavity and connected for longitudinal movement with said second portion of said socket deforming means, said control means being disposed in the path over which the plug will travel when it is being inserted in a longitudinal direction in said socket for being moved longitudinally by the plug at least during the latter portion of its insertion travel, this movement of said control means operating to cause said second portion of said socket deforming means to deform said socket into its plug-gripping position; and (e) said first portion of said deforming means comprising friction holding means constituted by a friction surface which is inclined in a longitudinal direction at every point along its length and positioned to cooperate with said second portion of said deforming means to create a longitudinal restraining friction force which maintains said second portion in that position in which it causes said socket to tightly grip the plug, and to maintain a substantially constant gripping pressure on the plug, as said friction surface engages said second portion when the plug has been fully inserted, said holding means applying to said second portion of said deforming means a longitudinal restraining friction force of sufficient magnitude to prevent said socket from returning to its open position as long as no withdrawal force is exerted on the plug, but such restraining friction force being less than the combined opposing longitudinal force exerted on said second portion when the plug is being withdrawn from said socket, whereby said second portion moves in unison with the plug during plug withdrawal.

2. Electrical connector as recited in claim 1, wherein said socket has a conical surface over at least a portion of its length which defines said second portion of said socket deforming means, and said first portion of said socket deforming means comprises an annular spring which encircles at least part of said conical portion of said socket.

3. Electrical connector as recited in claim 1 wherein said first portion of said socket deforming means is composed of a camming surface which cooperates with said second portion of said socket deforming means.

4. Electrical connector as recited in claim 3 wherein said socket deforming means comprises an electric pincer which surrounds said socket and which carries said camming surface.

5. Electrical connector means as recited in claim 3, wherein said camming means is formed in the walls of said cavity as an inclined plane extending from the region where said cavity communicates with the region outside said housing to the inner portion of said cavity.

6. Electrical connector as recited in claim 5 wherein: said socket is generally cylindrical in shape and has its longitudinal axis aligned with the portion of said cavity which is in communication with the region outside of said housing, the end of said socket which is closer to said last-named cavity portion being referred to as the forward end, said socket having a plurality of longitundinal slots cut into its forward end so that a portion of said socket is in the form of a series of radially flexible strips, said socket also having a pair of diametrically opposed openings cut into its center portion; said second portion of said socket deforming means comprises a cylindrical member including a plurality of inwardly arched, circumferentially spaced, longitudinally-extending, elastically deformable leaf springs placed around said socket in coaxial alignment therewith and said control means comprises a base member rigidly connecting the rear ends of all of said leaf springs and having a pair of inwardly extending tabs, each of which extends through a respective one of said diametrically opposed socket openings into the volume enclosed by said socket so as to be disposed in said path over which the plug will travel during insertion.

7. Electrical connector as recited in claim 5 further comprising elastic restoring means for urging said socket into its open position, wherein said socket, said second portion of said socket deforming means and said elastic restoring means are constituted by a unitary element comprising a pair of laterally displaced arms forming a plug-receiving channel of indefinite width perpendicular to its lateral dimension, each of said arms having a longitudinal dimension which is mutually perpendicular to both said lateral dimensions and said width, and each of said arms having a longitudinally forward portion near the region where said cavity communicates with the region outside said housing, and a rear portion removed therefrom; said forward portion being laterally flexible and forming said socket and said second portion of said socket deforming means, and said rear portion being curved laterally outwardly with respect to said forward portion and forming said elastic restoring means.

8. Electrical connector as recited in claim 5, wherein said socket and said second portion of said socket deforming means comprise at least one unitary, longitudinally-extending arm which is curved so as to be convex towards the interior of said cavity.

9. Electrical connector as recited in claim 8 wherein a portion of said arm is folded with respect to the portion constituting said socket and said second portion of said socket deforming means and bears against the base of said cavity, said folded means constituting an elastic restoring means.

10. Electrical connector as recited in claim 1 wherein said second portion of said socket deforming means comprises a spring disposed in a longitudinally movable manner in the region enclosed by said socket.

11. Electrical connector as recited in claim 10 wherein said spring comprises: a torsion spring; a pair of arms joined to opposite ends of said spring and folded at right angles to the axis of said spring; and a pair of bearing elements each of which is rigidly joined to one of said arms and bears against the outer surface of said socket; whereby said bearing elements tend to radially deform said socket inwardly of said cavity.

12. An electrical connector comprising, in combination:

(a) a housing defining a cavity which is in communication with the region outside said housing;

(b) at least one socket composed of a longitudinally extending elastically deformable strip disposed in said housing cavity for receiving a plug to be inserted in a longitudinal direction, said socket being movable in longitudinal direction between a first position and a second position, said socket further being elastically deformable in a transverse direction and, when in its first position, offering substantially no friction resistance to the insertion of the plug;

(c) elastic restoring means operatively connected with said socket for maintaining it in said first position;

(d) socket deforming means composed of a rotatable element having two stable positions and held under pressure between a point of attachment on said strip and a pivot point on a wall of said cavity for deforming said socket in said transverse direction, into plug-gripping condition, when said socket is in its said second position; and (e) at least one control means disposed within said cavity and operatively associated with said socket, said control means being disposed in the path over which the plug will travel during insertion for movement in a longitudinal direction during at least the last portion of insertion travel of the plug for driving said socket from its said first position to its said second position when said control means is moved longitudinally by the plug.

13. Electrical connector as recited in claim 12 wherein said rotatable element is in the form of a curved elastic blade.

14. Electrical connector as recited in claim 12 wherein said rotatable element is a rigid bar.

15. An arrangement as defined in claim 12 wherein said socket moves from its said first position to its said second position in unison with the last portion of longitudinal insertion travel of the plug, so that no sliding motion occurs between the plug and said socket when the latter is moving between its said longitudinal positions.

References Cited

UNITED STATES PATENTS

| | | |
|---|---|---|
| 1,990,687 | 2/1935 | Godare. |
| 2,087,538 | 7/1937 | Godare _____ 339—259 X |
| 2,711,523 | 6/1955 | Willis _____ 339—253 |
| 3,122,408 | 2/1964 | Laszczewski _____ 339—273 |
| 3,229,243 | 1/1966 | Gomulka _____ 339—259 X |
| 3,300,752 | 1/1967 | Benoit et al. _____ 339—253 |

FOREIGN PATENTS 803,001  10/1958  Great Britain.

MARVIN A. CHAMPION, *Primary Examiner.*

P. TEITELBAUM, *Assistant Examiner.*